US012773672B2

(12) United States Patent
Hillemann et al.

(10) Patent No.: US 12,773,672 B2
(45) Date of Patent: Oct. 27, 2026

(54) DEVICE AND METHOD FOR SEPARATING PARTICLES FROM AEROSOLS FOR CONDITIONING TEST AEROSOLS FOR PENETRATION MEASUREMENT ON FILTERS

(71) Applicant: TOPAS GMBH TECHNOLOGIE-ORIENTIERTE PARTIKEL-, ANALYSEN- UND SENSORTECHNIK, Dresden (DE)

(72) Inventors: Lars Hillemann, Dresden (DE); Andreas Rudolph, Dresden (DE)

(73) Assignee: TOPAS GMBH TECHNOLOGIE-ORIENTIERTE PARTIKEL-, ANALYSEN-UND SENSORTECHNIK, Dresden (DE)

( * ) Notice: Subject to any disclaimer, the term of this patent is extended or adjusted under 35 U.S.C. 154(b) by 180 days.

(21) Appl. No.: 18/554,956

(22) PCT Filed: Sep. 9, 2022

(86) PCT No.: PCT/EP2022/075103
§ 371 (c)(1),
(2) Date: Oct. 11, 2023

(87) PCT Pub. No.: WO2023/036929
PCT Pub. Date: Mar. 16, 2023

(65) Prior Publication Data

US 2024/0198309 A1 Jun. 20, 2024

(30) Foreign Application Priority Data

Sep. 13, 2021 (DE) ........................ 102021123609.6

(51) Int. Cl.
*B01J 13/00* (2006.01)
*G01N 1/22* (2006.01)

(52) U.S. Cl.
CPC ........ *B01J 13/0095* (2013.01); *G01N 1/2205* (2013.01); *G01N 2001/2223* (2013.01)

(58) Field of Classification Search
CPC ............... B01J 13/0095; G01N 1/2205; G01N 2001/2223
See application file for complete search history.

(56) References Cited

U.S. PATENT DOCUMENTS 3,733,792 A * 5/1973 Taylor .................. B01D 46/527 55/525
3,751,715 A * 8/1973 Edwards ................... B03C 3/47 313/355

(Continued)

FOREIGN PATENT DOCUMENTS

CN 109069773 A 12/2018
DE 19825193 A1 12/1999

(Continued)

OTHER PUBLICATIONS

International Search Report and Written Opinion of International Application No. PCT/EP2022/075103, mailed on Jan. 20, 2023, 14 pages. Full translation.

(Continued)

*Primary Examiner* — Dung H Bui
(74) *Attorney, Agent, or Firm* — Heslin Rothenberg Farley & Mesiti P.C.

(57) ABSTRACT

The invention relates to a device and a method for separating particles from aerosols for conditioning test aerosols for penetration measurement on filters. The device for separating particles from aerosols for conditioning test aerosols for penetration measurement on filters is characterised in particular by being able to generate test aerosols for penetration measurement having particular and defined properties. For this purpose, at least one sieve, which fills the aerosol-conducting cross section of the component, is located in an (Continued)

aerosol-conducting, preferably tubular, component having an inlet and an outlet for the aerosol, for impingement and/or impaction of particles from the aerosol. Furthermore, the aerosol-conducting, preferably tubular, component has at least one port for supplying or removing air in the direction of flow of the aerosol upstream of the sieve for impingement and/or impaction of particles from the aerosol or a part supplying aerosol to the component.

19 Claims, 3 Drawing Sheets

(56) References Cited

U.S. PATENT DOCUMENTS

| | | | | |
|---|---|---|---|---|
| 3,798,879 | A * | 3/1974 | Schmidt-Burbach | B03C 3/155 55/482 |
| 3,954,428 | A * | 5/1976 | Marple | G01N 1/2247 96/417 |
| 4,443,233 | A * | 4/1984 | Moran | B01D 45/08 55/315 |
| 4,570,494 | A * | 2/1986 | Dunn | G01N 1/2214 73/863.22 |
| 4,764,186 | A * | 8/1988 | Langer | G01N 1/2202 95/278 |
| 5,938,823 | A * | 8/1999 | Condit | B03C 3/017 96/225 |
| 6,187,271 | B1 * | 2/2001 | Lee | B03C 3/016 96/225 |
| 7,299,711 | B1 * | 11/2007 | Linker | G01N 1/2214 73/863.23 |
| 9,744,490 | B1 * | 8/2017 | Novosselov | B01D 45/08 |
| 11,471,551 | B1 * | 10/2022 | Leavitt | C01B 13/11 |
| 11,517,939 | B1 * | 12/2022 | Knepp | D03D 9/00 |
| 11,940,365 | B1 * | 3/2024 | Kesavan | G01N 1/2273 |
| 2005/0178111 | A1 * | 8/2005 | Kammel | F01N 3/021 60/297 |
| 2005/0223899 | A1 * | 10/2005 | Kulmala | B03C 3/155 96/88 |
| 2006/0081515 | A1 * | 4/2006 | Gorbunov | G01N 15/0255 209/660 |
| 2007/0023641 | A1 * | 2/2007 | Weitz | G01N 35/1097 250/288 |
| 2011/0023429 | A1 * | 2/2011 | Janakiraman | B01D 45/08 55/434 |
| 2011/0056381 | A1 * | 3/2011 | Azwell | B01D 46/0031 96/297 |
| 2012/0045752 | A1 * | 2/2012 | Ensor | C12Q 1/24 977/788 |
| 2012/0174650 | A1 * | 7/2012 | Ariessohn | B03C 3/41 73/23.2 |
| 2012/0251412 | A1 | 10/2012 | Nakayama | |
| 2013/0086876 | A1 * | 4/2013 | Ikeda | G01N 15/0255 55/418 |
| 2019/0366231 | A1 * | 12/2019 | Dooley | B03C 3/10 |
| 2020/0054994 | A1 * | 2/2020 | Stuhler | B01D 53/64 |
| 2020/0109869 | A1 * | 4/2020 | Mäkipää | B03C 3/47 |
| 2020/0139324 | A1 * | 5/2020 | Ostraat | B01J 2/18 |
| 2020/0225126 | A1 * | 7/2020 | Sur | G01N 21/8507 |
| 2020/0362543 | A1 * | 11/2020 | Alvarez | F28F 13/187 |
| 2021/0121805 | A1 * | 4/2021 | Cordatos | B01D 46/003 |
| 2021/0172840 | A1 * | 6/2021 | Finlay | G01N 13/00 |
| 2021/0322912 | A1 * | 10/2021 | Higgins | G01N 35/00 |
| 2022/0001392 | A1 * | 1/2022 | Jaffrey | B01D 53/30 |
| 2023/0160788 | A1 * | 5/2023 | Marsay | G01N 1/2208 73/863.22 |
| 2023/0228665 | A1 * | 7/2023 | Hoeng | G01N 1/22 73/38 |

FOREIGN PATENT DOCUMENTS

| | | |
|---|---|---|
| DE | 19956260 A1 | 5/2001 |
| WO | 2008110165 | 9/2008 |
| WO | 2020047295 | 3/2020 |

OTHER PUBLICATIONS

Office Action for German Patent Application No. 102022123221.2, created on Jun. 10, 2025, 6 pages. Full Translation, 5 pages.

* cited by examiner

DEVICE AND METHOD FOR SEPARATING PARTICLES FROM AEROSOLS FOR CONDITIONING TEST AEROSOLS FOR PENETRATION MEASUREMENT ON FILTERS

CROSS REFERENCE TO RELATED APPLICATIONS

This application is a national stage filing under section 371 of International Application No. PCT/EP2022/075103, filed on Sep. 9, 2022, and published on Mar. 16, 2023 as WO 2023/036929, which claims priority to German Application No. 10 2021 123 609.6, filed on Sep. 13, 2021. The entire contents of WO 2023/036929 and German Application No. 10 2021 123 609.6 are hereby incorporated by reference herein.

The invention relates to a device and a method for separating particles from aerosols for conditioning test aerosols for penetration measurement on filters.

Test aerosols having defined properties are to be generated for filter testing. Since the properties of aerosols produced by droplet aerosol generators are always dependent on the thermodynamic boundary conditions and the material properties of the aerosol substances, a series connection of an aerosol generator and a system for aerosol conditioning is used to generate test aerosols. In this case, the aerosol generator provides a primary aerosol which is converted by the conditioning process into a secondary aerosol having desired properties. The conditioning process involves changing the particle size distribution according to the requirements of standards for filter testing, and uses methods for the size-selective separation of particles.

The mechanical inertia of the particles is used to separate particle fractions greater than 100 nm. This is based on the deflection of a particle-rich flow at an obstacle; very large, high-mass particles are unable to follow this deflection and are thus separated by impact separation. This is technically achieved by deflecting the flow at baffle plates or by using cyclone separators.

DE 10 2017 219 370 B3 discloses a device for producing an aerosol from solid particles of a liquid reservoir by means of cold nebulisation. This device comprises an atomisation nozzle having a baffle separator arranged downstream and a drying device, such that solid particles emerge from a liquid reservoir. A broad particle size distribution is disadvantageously obtained.

CN 1 09 069 773 B discloses a vaporisation arrangement for an aerosol-generating system comprising a liquid-permeable surface heating element and a dispensing apparatus for dispensing an aerosol-forming liquid substrate from a liquid storage portion to the surface heating element, wherein the aerosol-forming liquid substrate supplied to the surface heating element heats up to a temperature sufficient to volatilise at least a part of the aerosol-forming liquid matrix supplied, wherein the liquid-permeable surface heating element comprises a multiplicity of conductive threads. Furthermore, CN 1 09 069 773 B discloses a gap between the liquid-permeable surface heating element and the housing and intermediate spaces between the filaments of the heating grid element in the range of 10 to 200 μm.

DE 198 25 193 A1 describes a method and a device for manufacturing silica aerosols having a particle size in the nanometer range for producing test aerosols comprising the light moistening of a surface that contains silicon dioxide, in particular a retiform, sponge-like structure containing silicon dioxide, using water and irradiation with ultraviolet light in the wavelength range between 150 and 230 nm, wherein particles in the nanometer range are emitted from the surface. DE 198 25 193 A1 discloses the overflow of the silicon dioxide-containing structure with a process gas. A filter for purifying the supplied process gases is also disclosed.

GB 2 578 581 A discloses an aerosol-detector test system comprising a vibration screen nebuliser for generating an aerosol, an aerosol line and an aerosol sensor instrument. The nebuliser is used for testing and calibrating aerosol sensors or detectors. The nebuliser comprises a liquid container, a net or a plate having a plurality of perforations, on the upper side of which the liquid is located and on the underside of which air is located, and a drive for vibrating the net or the plate. The drive generates a variable drive frequency, for example between 1 Hz and 100 kHz, so that the net or the plate can be set into oscillation with variable working cycles, such that the nebuliser can dispense different aerosol concentrations.

The object of the invention specified in claim 1 is that of generating test aerosols for penetration measurement with certain and defined properties.

This object is achieved with features listed in the independent claims. Advantageous embodiments are specified in the dependent claims.

The method according to the invention for separating particles from aerosols for conditioning test aerosols comprises the following steps:

a. introducing an aerosol into an aerosol-conducting, preferably tubular, component having an inlet and an outlet for the aerosol,
b. Impingement and/or impaction of particles from the aerosol using at least one sieve which fills the aerosol-conducting cross section of the component, and
c. supplying air or removing air in the direction of flow of the aerosol upstream of the sieve or upstream of the inlet for the aerosol.

According to the invention, the method is carried out with the sequence of steps a. and subsequently b. and c. In embodiments, steps b. and c. are carried out simultaneously.

In embodiments, the provision of the aerosol for introduction in step a. is carried out by an aerosol generator.

The devices for separating particles from aerosols for conditioning test aerosols for penetration measurement on filters are characterised in particular in that these test aerosols can be generated having certain and defined properties.

For this purpose, at least one sieve for impingement and/or impaction of particles from the aerosol, which sieve fills the cross section, is located in an aerosol-conducting, preferably tubular, component having an inlet and an outlet for the aerosol. Furthermore, the aerosol-conducting, preferably tubular, component has at least one port for supplying air in the direction of flow of the aerosol upstream of the sieve for impingement and/or impaction of particles from the aerosol or a part supplying aerosol to the component. In alternative embodiments, a removal of air takes place through the port for supplying air, as a result of which only a partial volume flow is conducted through the sieve.

In embodiments, an at least partially, preferably a complete, mixture of the aerosol and the supply air is carried out in step c. The port for supplying air advantageously achieves dilution of the aerosol and an increase in the volume flow, as a result of which the speed of the aerosol is increased.

In order to measure the average penetration of filters, for example for respiratory masks, test aerosols are used which can typically contain oil droplets or salt particles as the disperse phase. The size of the solid and/or liquid particles is not identical; rather, the disperse state thereof can be described by a particle size distribution which is determined by the method used for generating the aerosol and the material properties of the aerosol substance. While the test aerosol passes through the filter to be tested, its concentration is measured before and after the filter and the penetration is determined from the quotient. The value of the average penetration determined in this way thus results from the convolution of the fractional particle degree of the filter with the particle size distribution function of a particle feature. The feature is determined by the quantification method used for the concentration and can, for example, be the number of particles (counting measurement method), the mass (gravimetry) or the scattering cross section of the particles (photometer). A measured penetration is thus specifically both for the measurement method used and for the test aerosol used. These parameters are therefore defined in standards for testing filters; in particular a valid range for the mean value and the width of the particle size distribution is defined for the test aerosols. To adjust these parameters in the case of a test aerosol present, the device and the method for separating particles from aerosols are advantageously used for conditioning test aerosols for penetration measurement on filters.

Surprisingly, it has been found that the introduction of sieves in the rough particle range of greater than 100 nm into an aerosol-conducting component leads to an effective and defined particle separation.

The term “sieve” is understood to mean an impact separator having wires, threads and/or fibres arranged in parallel or predominantly in parallel, preferably with wires arranged in parallel or predominantly in parallel. For this purpose, the sieve or the sieves is/are connected to one another and to the inner wall of the component in a tight, preferably gas-tight manner. In embodiments, the sieves are bonded to one another by means of a hot-melt adhesive film, preferably an ethylene-vinyl acetate copolymer (EVA) film.

The separation effect of the sieves is not based on a diffusion separation, but on an impact separation of the particles at the thin wires of the sieves. It has been possible to demonstrate that the separation effect of the sieve fabric increases with increasing flow rate, such that increasingly finer particle fractions are separated.

In embodiments, the amount of the supply air flow is in the range of 1 to 70 l/min. Advantageously, the particle size distribution can thus be adjusted by varying the quantity of the supply air stream.

In embodiments, the inflow velocity of the supply air through the sieve in step c. is in the range of 0.010 to 5 m/s, preferably in the range of 0.020 to 2.5 m/s, particularly preferably in the range of 0.024 to 2.4 m/s.

In alternative embodiments, the inflow velocity is adjusted by partially removing a volume flow from the port for supplying air.

Advantageously, particles are separated at the sieves in the aerosol stream, which sieves can be arranged regularly over the cross section of the aerosol stream and in the direction of flow. The selective separation takes place on the lateral surface of the wires of the sieves. The separation efficiency is determined by the cross-sectional area of the separating wires and/or of the number of wires. Furthermore, this can be influenced by the number of sieves arranged one behind the other in the direction of flow of the aerosol.

In embodiments, the sieve has a wire diameter in the range of 20 μm to 50 μm, preferably in the range of 20 μm to 40 μm, particularly preferably approximately 40 μm.

In embodiments, the sieve has square meshes.

In embodiments, the sieve consists of metal or a metal alloy, preferably stainless steel, brass or bronze, particularly preferably stainless steel.

In embodiments, the sieve has five to nine sieve layers, preferably six to eight sieve layers, particularly preferably seven sieve layers.

In embodiments, the sieve has spacers between the sieve layers. In embodiments, the spacers are sieves with a wire diameter in the range of 100 μm to 500 μm, preferably 200 μm to 300 μm, particularly preferably 250 μm.

In embodiments, the diameter of the sieve is in the range of 30 to 50 mm, preferably 35 to 40 mm, particularly preferably 38 mm.

Advantageously, the inflow velocity of the sieve or the sieves can be selected by feeding in an additional volume flow in such a way that a certain separation effect is achieved. This makes it easy to alter the separation efficiency of the device for separating particles from aerosols. This is done by feeding supply air or removing air, which causes a change in the inflow velocity of the at least one sieve by changing the volume flow. The separation efficiency can be adjusted before startup by the selection of the cross-sectional area of the separating sieve and/or by the selection of the number of sieves arranged one behind the other in the direction of flow. This defines a region of the separation efficiency for a certain region of the volume flow through the device.

This requires a mechanical change of the separating sieves. This measure is therefore suitable for the rough adjustment of the separation efficiency. Before or during operation, the separation efficiency of the device can be adjusted by the controlled supply of air or removal of air, which does not require any mechanical change of the at least one separating sieve. In particular, a fine-tuning of the separation efficiency of the device can thus take place, which considerably facilitates the adjustment of the desired particle size distribution.

In embodiments of the invention, the sieve is formed from wires, threads and/or fibres arranged in parallel or predominantly in parallel. Furthermore, the sieve is arranged in the aerosol-conducting, preferably tubular, component in such a way that the wires, threads and/or fibres of the sieve are flowed through transversely.

The dimensions of cross sections of adjacent wires, threads and/or fibres can be identical or different from one another.

The wires and/or fibres can have circular or polygonal cross sections.

The shapes of cross sections of adjacent wires and/or fibres can be identical or different from one another.

In the direction of flow of the aerosol, in embodiments of the invention, several sieves for impingement and/or impaction are arranged in succession in the aerosol-conducting, preferably tubular, component. In this case, sieves can also be arranged at a distance from one another.

In embodiments of the invention, the sieves arranged in the aerosol-conducting, preferably tubular, component in the direction of flow of the aerosol are arranged in such a way that a wire, a thread and/or a fibre of a sieve arranged downstream in the direction of flow are located in the space between two wires, threads and/or fibres of the sieve arranged upstream, such that the wires, threads and/or fibres of the downstream sieve are located in the flow of the aerosol after the upstream sieve.

An air-conveying device connected to the supply air port or an air-sucking device and an aerosol-conveying device connected to the inlet and/or an aerosol generator can be connected to a control device.

In order to fulfil the invention, it is also expedient to combine the above-described designs, exemplary embodiments, and features of the claims according to the invention in each arrangement with one another.

EXEMPLARY EMBODIMENT

The invention is explained in more detail below with reference to an exemplary embodiment. The exemplary embodiment is intended to describe the invention without limiting it.

The invention is explained in more detail with reference to drawings.

In the drawings:

FIG. 1 shows a device for separating particles from aerosols with a port for supplying air and FIG. 2 shows a device in connection with an aerosol generator.

A device for separating particles from aerosols for conditioning test aerosols for penetration measurement on filters consists substantially of an aerosol-conducting tubular component 1 having an inlet 2 and an outlet 3, sieves 4 which completely fill the aerosol-conducting cross section of the component 1, and a port 5 for supplying air 6.

FIG. 3 shows a device for separating particles from aerosols for conditioning test aerosols for penetration measurement on filters to the port 9 at an aerosol generator 8 consisting of an aerosol-conducting tubular component 1 having an outlet 3, sieves 4 which completely fill the aerosol-conducting cross section of the component 1, and a port 5 for supplying air 6.

Figure 1:
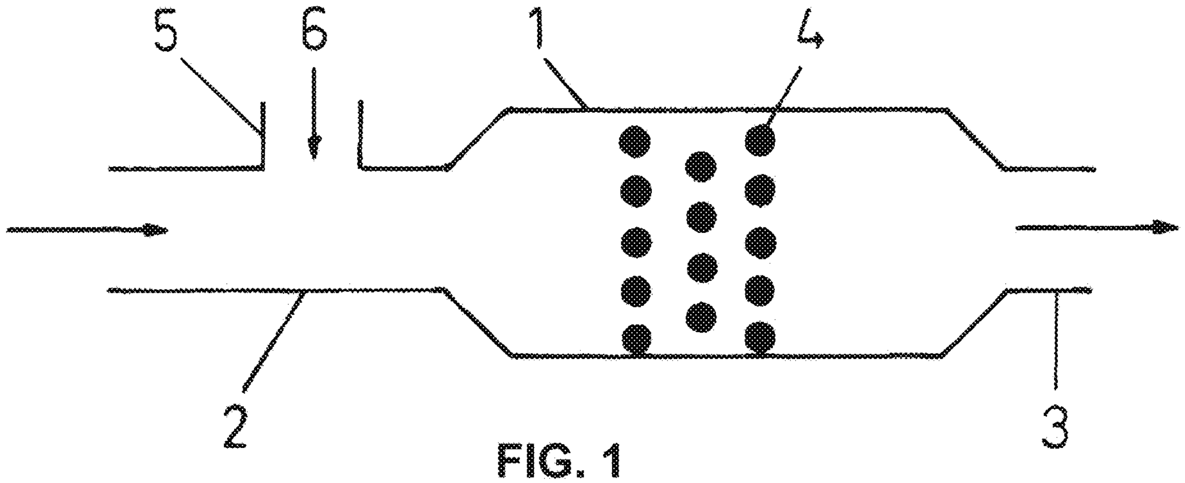
FIG. 1 shows a device for separating particles from aerosols having a port 5 for supplying air 6, in a basic illustration.

The aerosol-conducting tubular component 1, hereinafter only referred to as the component 1, has the inlet 2 for the primary aerosol and the outlet 3 for the secondary aerosol. The sieves 4 arranged at a distance from one another and in succession are located in the component 1 for impingement and/or impaction of particles from the aerosol flowing through the component 1. The sieves 4 are formed from wires arranged in parallel or predominantly in parallel. The sieves 4 are arranged in the component 1 such that the wires of the sieves 4 are flowed through transversely. Furthermore, the sieves 4 are arranged such that a wire of a second sieve 4 arranged downstream in the direction of flow of the aerosol is located in the distance between two wires of the first sieve 4 arranged upstream, such that the wires of the second sieve 4 are located in the flow of the aerosol after the first sieve 4. The wires of the sieves 4 are arranged in succession in gaps.

The dimensions of cross sections of adjacent wires can be identical or different from one another. Furthermore, the wires can have circular or polygonal cross sections. Moreover, the shapes of cross-sections of adjacent wires can be identical or different from one another. Edges of the wires which are polygonal in cross section can in this case point in the direction of the inlet 2 of the component 1 for the aerosol.

Cylindrical wires as body impactors and their arrangement in parallel so as to form a sieve 4 are an advantageous embodiment. Such wires in geometrically defined form are easily and cost-effectively available. By selecting the wire diameter and the flow rate of the aerosol through the sieve 4, the separation particle size of the device is adjustable. The sequential arrangement of sieves 4 in combination with different inflow velocities can influence both the separation particle size and the steepness of the separation function. The distance between the sieves 4 can be selected such that separated liquid aerosol material, such as oil from the sieve 4 or the sieves 4, runs downwards and can be discharged as a liquid film from the component 1. One possible embodiment of the arrangement of several sieves 4 forms an alternating series connection of sieves 4 for separation and sieves 4 having significantly larger wire spacings as spacers between sieves 4.

In the direction of flow of the aerosol before the sieves 4 for impingement and/or impaction of particles from the aerosol, the component 1 has at least one port 5 for supplying air 6.

Figure 2:
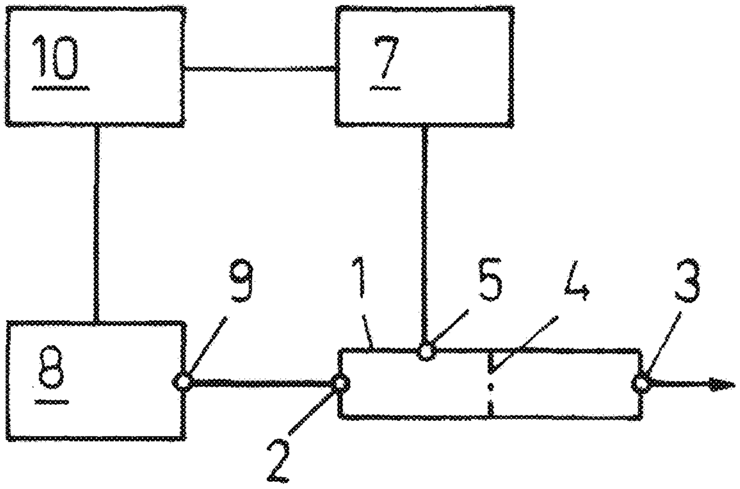
Figure 3:
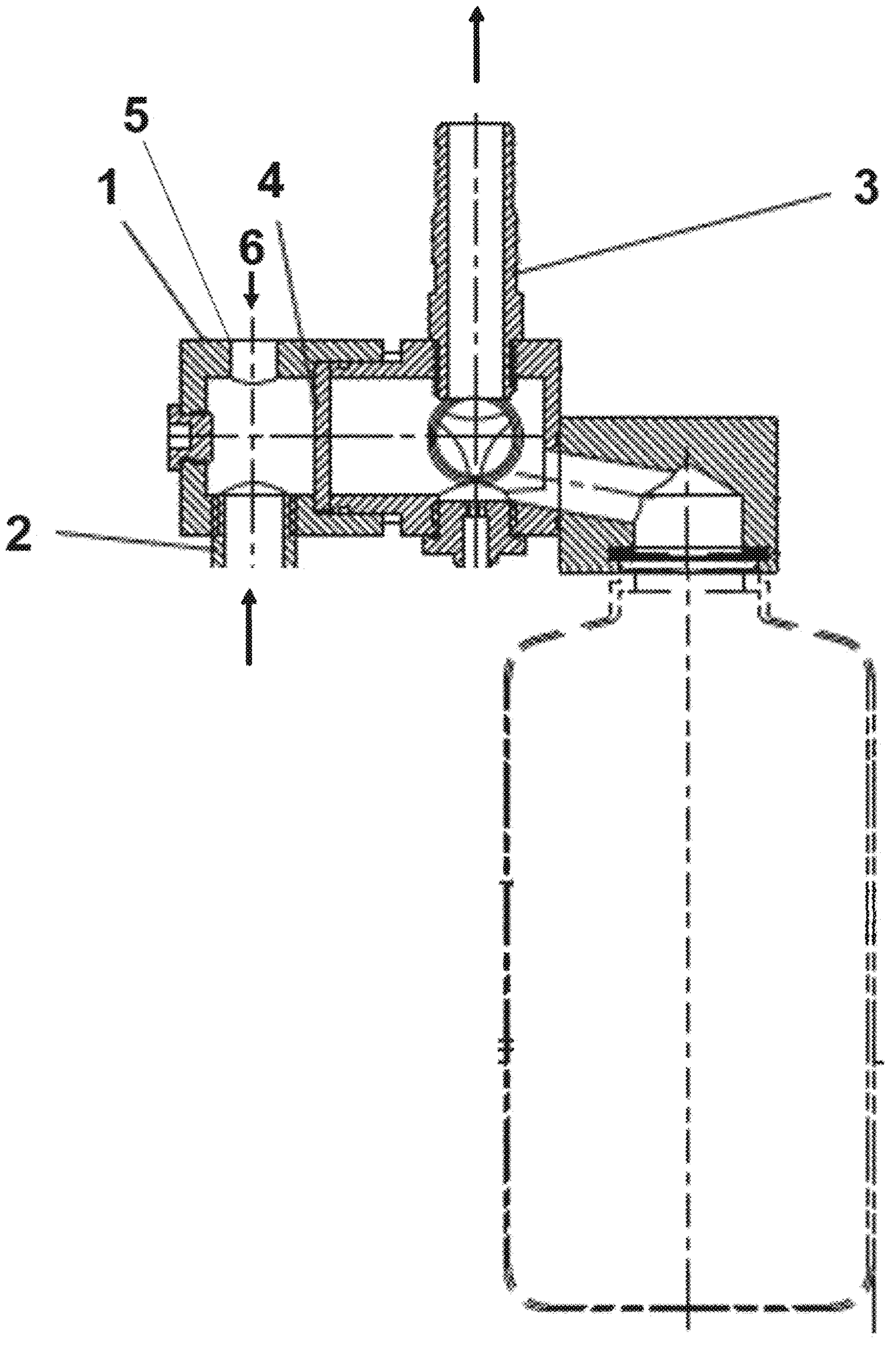

FIG. 2 shows a device in connection with an aerosol generator 8 in a basic illustration.

In one embodiment, an air-conveying device 7 connected to the port 5 for supplying air and an aerosol generator 8 upstream of the component 1 can be connected to a control device 10. The output 9 of the aerosol generator 8 is connected to the inlet 2 of the component 1 for this purpose.

Figure 4:
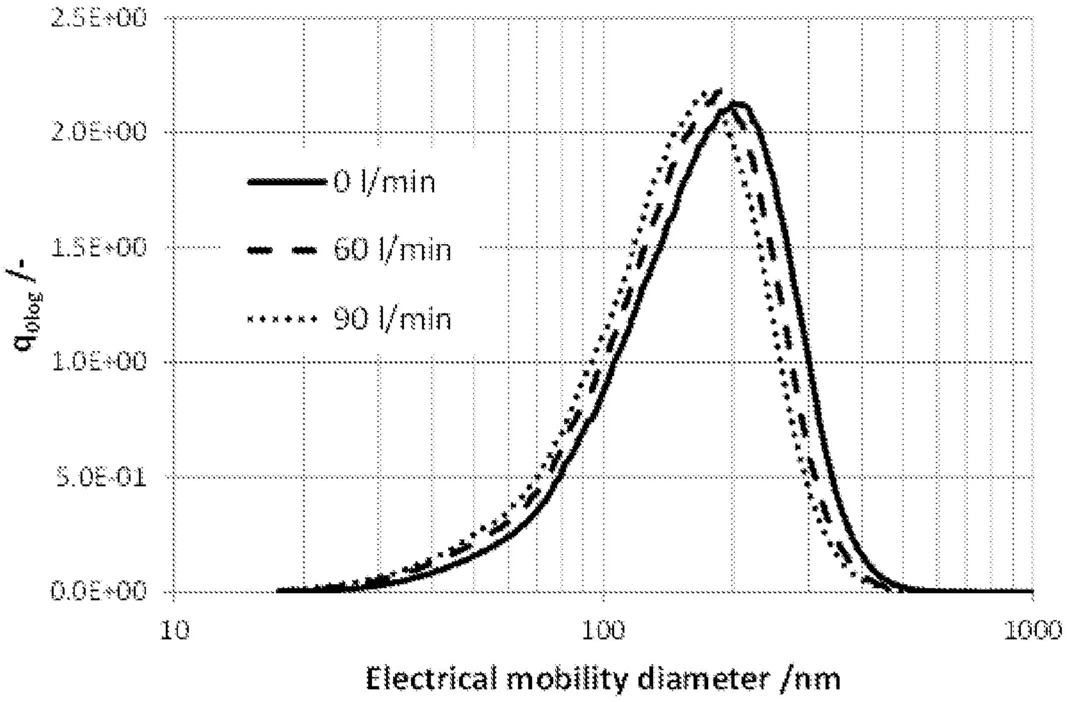
FIG. 4 shows the density function $q_{0log}$ of the particle size distribution of the aerosol after the separator in accordance with the air supply volume flow (0, 60 and 90 l/min).
Figure 5:
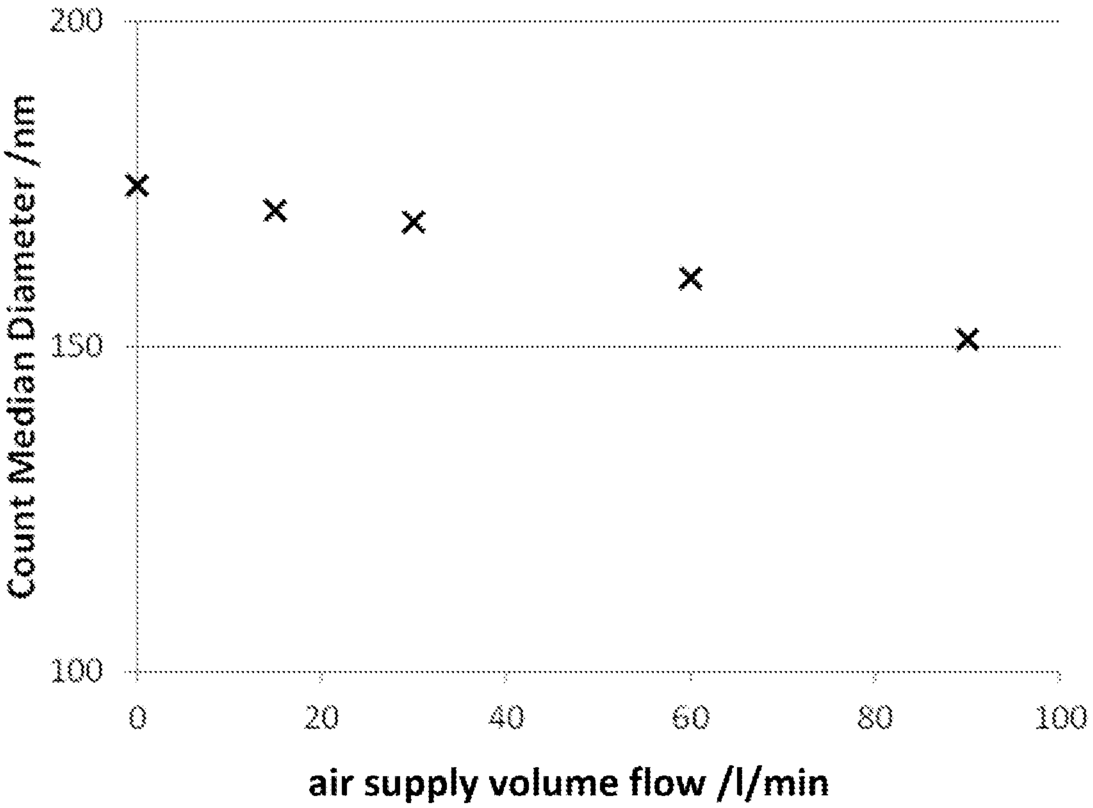
FIG. 5 shows the median value of the particle size distribution in accordance with the supply air volume flow.

FIGS. 4 and 5 show the influence of the supply air flow on the aerosol particles. FIG. 4 shows the density function $g_{0log}$ of the particle size distribution of the aerosol after the sieve in accordance with the supply air volume flow (0, 60 and 90 l/min), wherein a displacement is observed in accordance with the supply air volume flow, i.e. a decrease in the particle diameter with increasing supply air flow.

FIG. 5 shows the median value of the particle size distribution in accordance with the supply air volume flow (0, 15, 30, 60 and 90 l/min). A decrease in the particle size is likewise observed with increasing supply air volume flow.

REFERENCE SIGNS

1 aerosol-conducting component
2 inlet of the aerosol-conducting component
3 outlet for secondary aerosol
4 sieve
5 port for supplying air
6 supply air
7 air-conveying device
8 aerosol generator
9 output of the aerosol generator
10 control device

The invention claimed is:

1. A method for separating particles from aerosols for conditioning test aerosols, comprising the following steps:
   a. introducing an aerosol into an aerosol-conducting component having an inlet and an outlet for the aerosol,
   b. impingement and/or impaction of particles from the aerosol using at least one sieve which fills an aerosol-conducting cross section of the component, wherein each sieve of the at least one sieve is wires arranged in parallel or predominantly in parallel with each other and having a wire diameter in the range of 20 μm to 50 μm, and
   c. supplying air to or removing air from the component in the direction of flow of the aerosol upstream of the sieve or upstream of the inlet for the aerosol via at least one port of the component wherein the at least one sieve comprises a plurality of sieves that are arranged in succession in the aerosol-conducting component in the direction of the flow of the aerosol.

2. The method according to claim 1, wherein steps b. and c. are carried out simultaneously.

3. The method according to claim 1, wherein an at least partial mixture of the aerosol and the supply air takes place in step c.

4. The method according to claim 1, wherein an inflow velocity of the aerosol at the at least one sieve is in the range of 0.010 to 5 m/s as a result of supplying air or removing air in step c.

5. A device for separating particles from aerosols for conditioning test aerosols for penetration measurement on filters, comprising:

an aerosol-conducting component having an inlet and an outlet for a flow of the aerosol therethrough, and at least one sieve which fills the an aerosol-conducting cross section of the component for impingement and/or impaction of particles from the aerosol, wherein each sieve of the at least one sieve is wires arranged in parallel or predominantly in parallel with each other and having a wire diameter in the range of 20 μm to 50 μm, and wherein the aerosol-conducting component has at least one port configured to supply air or remove air from the component in the direction of the flow of the aerosol upstream of the at least one sieve or of the inlet wherein the at least one sieve comprises a plurality of sieves that are arranged in succession in the aerosol-conducting component in the direction of the flow of the aerosol.

6. The device according to claim 5, wherein the at least one sieve is arranged in the aerosol-conducting component such that the wires of the at least one sieve are flowed through transversely.

7. The device according to claim 5, wherein the wires of each sieve of the at least one sieve have circular or polygonal cross sections.

8. The device according to claim 7, wherein each sieve of the at least one sieve consists of a metal or a metal alloy.

9. The device according to claim 7, wherein the at least one sieve comprises a plurality of sieves that are arranged in succession in the aerosol-conducting component in the direction of the flow of the aerosol.

10. The device according to claim 5, wherein each sieve of the at least one sieve consists of a metal or a metal alloy.

11. The device according to claim 10, wherein the at least one sieve comprises a plurality of sieves that are arranged in succession in the aerosol-conducting component in the direction of the flow of the aerosol.

12. The device according to claim 5, wherein the least one sieve comprises a plurality of sieves that are arranged in succession in the aerosol-conducting component in the direction of flow of the aerosol.

13. The device according to claim 12, wherein the plurality of sieves are arranged such that the wires of a first sieve of the plurality of sieves that is arranged downstream in the direction of flow are each located in the space between two adjacent wires of the wires of a second sieve of the plurality of sieves arranged upstream of the first sieve, such that the wires of the downstream first sieve are located in the flow of the aerosol after the upstream second sieve.

14. The device according to claim 5, wherein an air-conveying device connected to the port for supplying air and an aerosol-conveying device connected to the inlet of the component and/or an aerosol generator are connected to a control device.

15. A method, comprising: separating particles from aerosols for conditioning test aerosols for penetration measurement on filters using a device according to claim 5.

16. The method according to claim 15, wherein the method comprises introducing a flow of an aerosol into the aerosol-conducting component via the inlet, and supplying air or removing air in a direction of flow of the aerosol upstream of the sieve or upstream of the inlet via the at least one port simultaneously with impingement and/or impaction of particles from the aerosol with the at least one sieve.

17. The method according to claim 15, wherein the method comprises introducing a flow of an aerosol into the aerosol-conducting component via the inlet, and supplying air in a direction of flow of the aerosol upstream of the sieve or upstream of the inlet via the at least one port to form an at least partial mixture of the aerosol and the supply air.

18. The method according to claim 15, wherein the method comprises introducing a flow of an aerosol into the aerosol-conducting component via the inlet and supplying air or removing air in a direction of flow of the aerosol upstream of the sieve or upstream of the inlet via the at least one port such that an inflow velocity of the flow of the aerosol at least one sieve is in the range of 0.010 to 5 m/s.

19. The device according to claim 5, wherein the wires of each sieve of the at least one sieve are substantially aligned in the direction of flow of the aerosol through the component.

* * * * *